United States Patent
Xu (10) Patent No.: US 9,237,025 B2
(45) Date of Patent: Jan. 12, 2016

(54) SOURCE ROUTING IN MULTICAST TRANSMISSIONS

(71) Applicant: VERIZON PATENT AND LICENSING INC., Basking Ridge, NJ (US)

(72) Inventor: Fengman Xu, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 240 days.

(21) Appl. No.: 13/968,333

(22) Filed: Aug. 15, 2013

(65) Prior Publication Data

US 2015/0049760 A1    Feb. 19, 2015

(51) Int. Cl.
*H04L 12/18*    (2006.01)
*H04L 12/761*    (2013.01)

(52) U.S. Cl.
CPC ........ *H04L 12/1886* (2013.01); *H04L 12/1863* (2013.01); *H04L 45/16* (2013.01); *H04L 2212/00* (2013.01); *H04L 2212/0025* (2013.01)

(58) Field of Classification Search
None
See application file for complete search history.

(56) References Cited

U.S. PATENT DOCUMENTS

| | | | | |
|---|---|---|---|---|
| 5,446,736 | A * | 8/1995 | Gleeson et al. | 370/473 |
| 2006/0114904 | A1 * | 6/2006 | Lee | 370/390 |
| 2010/0002697 | A1 * | 1/2010 | Krishnan et al. | 370/390 |
| 2010/0046512 | A1 * | 2/2010 | Xia et al. | 370/389 |
| 2012/0044837 | A1 * | 2/2012 | Ibanez Fernandez et al. | 370/256 |

OTHER PUBLICATIONS

A. Striegel et al. "DSMCast: a scalable approach for DiffServ multicasting" Apr. 22, 2004, computer Networks, vol. 44 issue 6, pp. 713-735.*
"Implementing Layer-3 Multicast Routing on Cisco IOS XR Software," Cisco ASR 9000 Series Aggregation Services Routers Multicast Configuration Guide, Release 4.2x Retrieved on Jul. 15, 2013, from Cisco's website: www.cisco.com/en/US/docs/routers/asr9000/software/asr9K_r4.2/multicast/configuration/guide/b_mcast_cg42asr9k_chapter_01.html <http://www.cisco.com/en/US/docs/routers/asr9000/software/asr9K_r4.2/multicast/configuration/guide/b_mcast_cg42asr9k_chapter_01.html>.
"Configuring a Rendezvous Point," IP Multicast—Cisco Systems. Retrieved on Aug. 9, 2013, from Cisco's website: www.cisco.com/en/US/docs/ios/solutions_docs/ip_multicast/White_papers/rps.html <http://www.cisco.com/en/US/docs/ios/solutions_docs/ip_multicast/White_papers/rps.html>.
J. Jannotti, D. K. Gifford, K. L. Johnson, M. F. Kaashoek, and J. W. O'Toole. "Overcast: Reliable multicasting with an overlay network," In Proc. OSDI 2000, San Diego, CA, 2000.

(Continued)

*Primary Examiner* — Hicham Foud (57) ABSTRACT

The subject technology provides configurations for receiving, at a first network device, a multicast packet of a multicast transmission from a multicast source. A header is inserted including one or more fields of information for a multicast distribution tree into the multicast packet in which the fields of information include a root level node field indicating a root node of the multicast distribution tree and one or more second level fields indicating one or more child nodes of the root node of the multicast distribution tree. In one example, the fields of information are not duplicative of routing information, stored by the first network device, corresponding to the one or more child nodes. The subject technology then forwards the multicast packet including the inserted header to respective network devices corresponding to the one or more child nodes based on the one or more fields of information from the inserted header.

22 Claims, 10 Drawing Sheets

(56) References Cited

OTHER PUBLICATIONS

"Internet Protocol IP Multicast Technology," IP Multicast—Cisco Systems. Retrieved on Aug. 9, 2013, from Cisco's website: www.cisco.com/en/US/tech/tk828/tech_brief09186a00800a4415.html <http://www.cisco.com/en/US/tech/tk828/tech_brief09186a00800a4415.html>.

"MPLS Point-to-Multipoint Traffic Engineering," Networking Software (IOS & NX-OS)—Cisco Systems. Retrieved on Jul. 15, 2013, from Cisco's website: www.cisco.com/en/US/docs/ios/mpls/configuration/guide/mp_te_2mp.html <http://www.cisco.com/en/US/docs/ios/mpls/configuration/guide/mp_te_2mp.html>.

"Rendezvous Point Engineering," IP Multicast—Cisco Systems. Retrieved on Aug. 9, 2013, from Cisco's website: www.cisco.com/en/US/prod/collateral/iosswrel/ps6537/ps6552/whitepaper.c11-508498.html <http://www.cisco.com/en/US/prod/collateral/iosswrel/ps6537/ps6552/whitepaper.c11-508498.html>.

E. Rosen, A. Viswanathan and R. Callon, "Multiprotocol Label Switching Architecture," RFC 3031, Jan. 2001.

S. Yasukawa, "Signaling Requirements for Point-to-Multipoint Traffic-Engineered MPLS Label Switched Paths (LSPs)" RFC 4461, Apr. 2006.

I. Pepelnjak, J. Apcar, and J. Guichard, Pepelnjak, "Using Multicast Domains." Network Architecture and Design (URL: <http://www>.ciscopress.com/articles/article.asp (2003).

* cited by examiner

SOURCE ROUTING IN MULTICAST TRANSMISSIONS

BACKGROUND

This disclosure generally relates to digital communications networks, such as local or wide area networks (LANs, WANs), the Internet, etc., for distribution of information from one network location to one or more devices at other network locations.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Digital communications networks, such as local or wide area networks (LANs, WANs), the Internet, etc., are networks for permitting information stored at one location to be distributed to one or more users situated at geographically different locations. The information (also referred to herein as a "message" or "packet" or "datagram") can take any of a number of forms including, but not limited to, text, still image, audio, and video information.

Digital communications networks may operate under the principal of point-to-point or connection-oriented communications (e.g., utilizing TCP/IP) in which information may be exchanged between one sending device and one receiving device. This manner of connectivity ensures reliability by establishing a connection between each and every receiving device using a connection based protocol. Unique connections are formed with each device if communication with multiple receiver devices is desired. However, the overhead incurred with creating and managing a connection between a sending device and a number of receiving devices may be prohibitively expensive when a large number of receiving devices are included.

Connectionless protocols have been developed for reducing the overhead associated with connection based protocols, such as UDP (user datagram protocol) over an IP network. Under a connectionless communication between two network end points, a message can be sent from one end point to another without prior arrangement. A computing device at one end of the communication transmits data addressed to the other, without first ensuring that the receiver is available and ready to receive the data. These connectionless protocols may rely on a broadcast or "multicast" model where a single message is broadcast to a multiple receiving devices without forming a connection with the individual systems. Multicasting enables a source to transmit messages to multiple receivers that have been collectively identified by a single IP destination address, rather than to each of the receivers' unique IP address individually.

Routing of data for multicasting may be controlled by routing protocols. For instance, Protocol-Independent Multicast (PIM) is a family of multicast routing protocols that can provide one-to-many distribution of data over the Internet. In one example, PIM is used to create multicast distribution trees, which in turn are used to forward multicast data packets.

A source tree is a form of a multicast distribution tree that includes one or more nodes representing various devices. For instance, a source device of multicast traffic is located at a node corresponding to the root of the source tree, receiver device(s) are nodes located at the ends of the branches of the source tree, and middle device(s), if any, are nodes located between the root and receiver device(s). Multicast traffic travels from the source device through the tree toward one or more receiver devices. In one example, a multicast forwarding table is utilized to determine which outgoing interface a multicast packet should be transmitted out on. The forwarding table may include one or more multicast state entries that are stored in a device (e.g., router) included in the source tree. State entries for a source tree may be represented using a notation (S, G) in which each state entry indicates routing information for delivering multicast data from a multicast source to a multicast group. In this example, the letter S represents an IP address of the source device, and G represents a group address.

In some configurations, a separate source tree must be provided for each source device that transmits multicast packets, even when each source device is transmitting data to the same group. Thus, an (S, G) forwarding state entry is maintained for each source device in the multicast network. It is therefore understood that source tree implementations incur a cost of maintaining additional multicast state information in the multicast network.

In a large service provider backbone, there is a concern over an amount of information required for tracking multicast states built from each multicast group, mobile virtual private network (mVPN), virtual private network, etc. Some existing implementations may provide tree aggregations in the form of a shared tree for these multicast groups or mVPNs to reduce the amount of multicast state information that is maintained. The shared tree may be stored in a network device such as a router acting as a root of the shared tree, which also represents a common point in the multicast network. In such implementations, each source device is required to transmit multicast traffic to the common point. In one example, each multicast state entry for a shared tree uses a notation (*, G), where the * or wildcard represents all sources, since all sources for a particular group share the same tree.

When receiver devices join a multicast group in a shared tree, the root of the tree is a corresponding network device representing the common point, and multicast traffic is transmitted from the network device at the common point toward the receiver devices. However, the shared tree may incur routing inefficiencies because multicast traffic from each source device must travel to the common point and then follow a path to each of the receiver devices. Thus, in a shared tree implementation, there is a tradeoff between optimal routing and the amount of state information that is maintained. Moreover, another tradeoff may be a reduction in bandwidth efficiency by routing all multicast traffic to the common point and then having the network device at the common point determine a forwarding decision(s) for the multicast data.

The subject technology reduces overhead for storing multicast state entries by including part or all the multicast state entries in data packets instead of storing such information in forwarding devices (e.g., routers) included in the core backbone of a digital communication network. This results in a tradeoff of dedicating an amount of data bandwidth for including information related to a distribution tree state in the data packets.

Reference now is made in detail to the examples illustrated in the accompanying drawings and discussed below.

Figure 1:
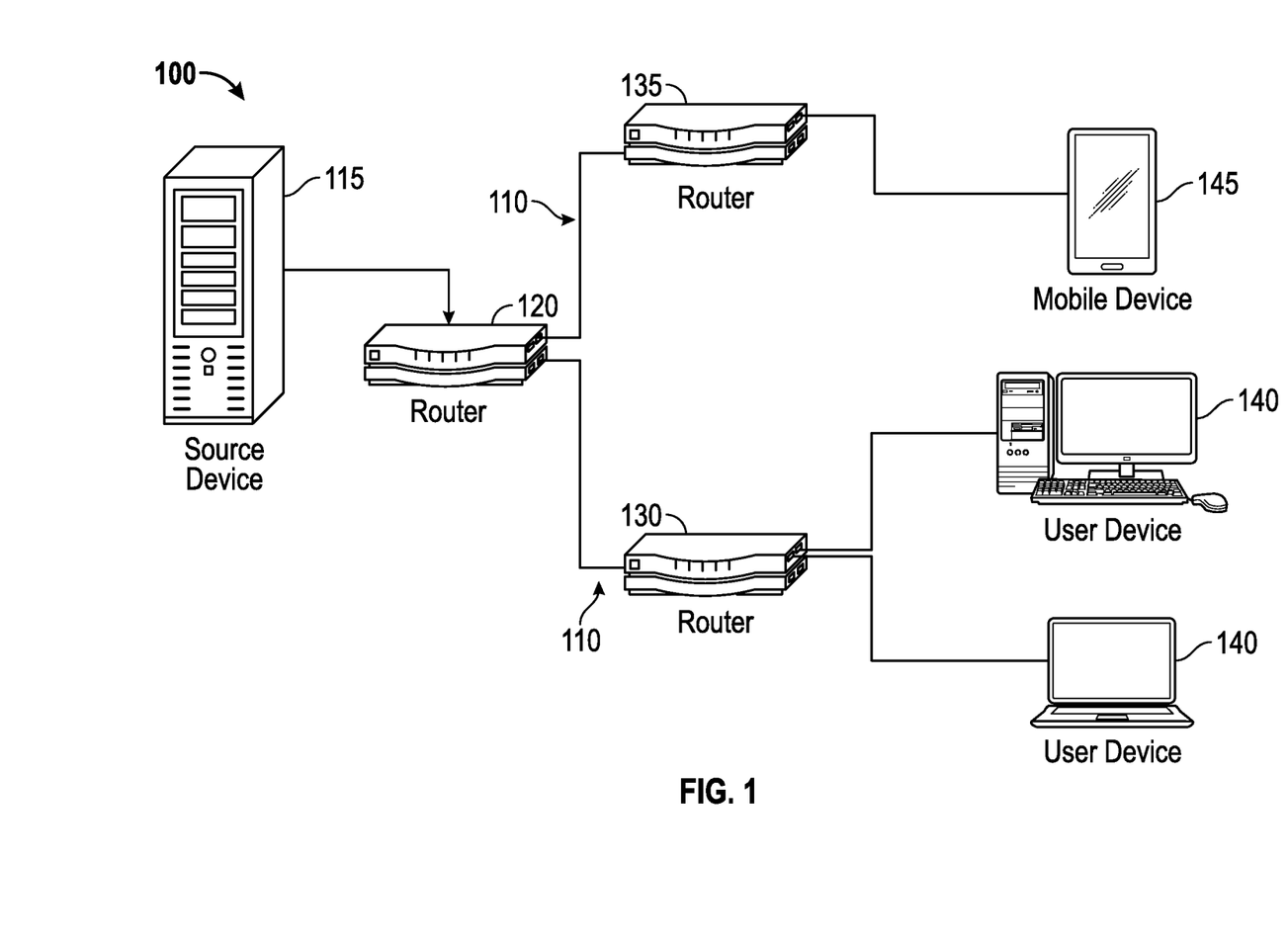
FIG. 1 illustrates an example system in which some configurations of the subject technology may be implemented.

FIG. 1 illustrates an example system 100 in which some configurations of the subject technology may be implemented. In FIG. 1, system 100 may include a network 110 that interconnects a multicast source device 115, a multicast-enabled network device 120, a second multicast-enabled network device 130, a third multicast-enabled network device 135, a group of user devices 140 and a mobile device 145. It will be appreciated that a typical system may include more or fewer devices than illustrated in FIG. 1. Moreover, system 100 may include additional devices (not shown) that aid in the transfer, processing, and/or reception of multicast data. The network 110 may include, for example, the Internet, an intranet, a local area network (LAN), a metropolitan area network (MAN), a wide area network (WAN), and/or some other similar type of network.

The network 110 may include any type of network or combination of networks that permits routing of information from a particular source to a particular destination. In some configurations, the network 110 provides mobile wireless communications services to one or more mobile devices. For instance, the network 110 may include a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The network 110 can be implemented by a number of interconnected networks. Hence, the overall network 110 may include a number of radio access networks (RANs), as well as regional ground networks interconnecting a number of RANs and a wide area network (WAN) interconnecting the regional ground networks to core network elements. A regional portion of the network 110 can include one or more RANs and a regional circuit and/or packet switched network and associated signaling network facilities.

The network device 120, the second network device 130 and the third network device 135 may be any suitable multicast-enabled device for forwarding messages and packets via UDP. Examples of suitable network devices include routers, switches, hubs, host systems, base stations, etc. User devices 140 may include a type of computer system, such as a mainframe, minicomputer, personal computer, tablet computer, and/or some other similar type of device that is capable of transmitting and receiving information to/from the network 110. The user devices 140 may connect to the network 110 via any conventional technique, such as a wired, wireless, or optical connection. The mobile device 145 may take the form of a portable handset, smart-phone or personal digital assistant, although it is appreciated that the mobile device 145 may be implemented in other form factors. The mobile device 145 may communicate over the air with the network 110 via the network device 135.

Figure 2:
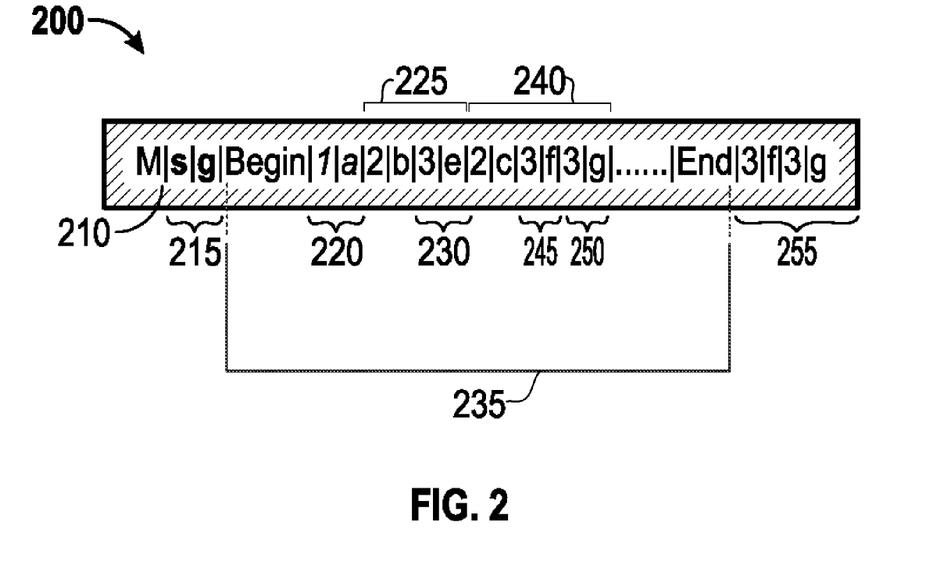
FIG. 2 conceptually illustrates an example header for including multicast state information in a given data packet of a multicast transmission.

FIG. 2 conceptually illustrates an example header 200 for including multicast state information in a given data packet of a multicast transmission. More specifically, the header 200 may include one or more fields of information for a multicast distribution tree that is included in the data packet(s) of the multicast transmission.

As shown in FIG. 2, the header 200 includes a packet type field 210 for indicating a data type (e.g., multicast), a tree group field 215 for indicating a multicast group (e.g., (S, G)). In the header 200, a tree body 235 spans various fields that represent different portions of the multicast distribution tree. For instance, the tree body 235 includes a root level node field 220 for indicating a root node 'a' of a multicast distribution tree, a second level field 225 including a node 'b' at the second level of the multicast distribution tree, a third level node field 230 including a node 'e' that is a child node from the node 'b' in second level of the tree.

Further, the tree body 235 includes a second level field 240 including a node 'c' at the second level of the multicast distribution tree, and third level node fields 245 and 250 respectively including a node 'f' and a node 'g' that each represent respective child nodes of the node 'c' in the second level of the tree. It should be appreciated that the tree body 235 may include additional fields for representing further portions of the multicast distribution tree.

The header 200 includes a field 255 that contains various flags to indicate which node(s) of the multicast distribution tree will be maintaining multicast state information (e.g., forwarding state information) for the multicast distribution tree locally. In the example of FIG. 2, the field 255 includes information indicating that nodes 'f' and 'g' will maintain forwarding state information for the multicast distribution tree defined in the tree body 235 locally at nodes 'f' and 'g'. Any nodes indicated by the various flags may forgo utilizing information included in the header 200 for determining a network device(s) to forward a given multicast packet toward.

Although the above example discusses a particular arrangement of fields in the header 200, other arrangements and configurations are possible and still within the scope of the subject technology. In some configurations, the header 200 may include a field indicating a length of the tree body 235 (e.g., specified in a number of bytes, etc.). This length field may be placed between the tree group field 215 and the tree body 235 in some examples. Further, the tree body 235, in some examples, may include the field 255 that contains various flags described above instead of having the field 255 appended to the end of the tree body 235 as shown in FIG. 2.

Figure 3:
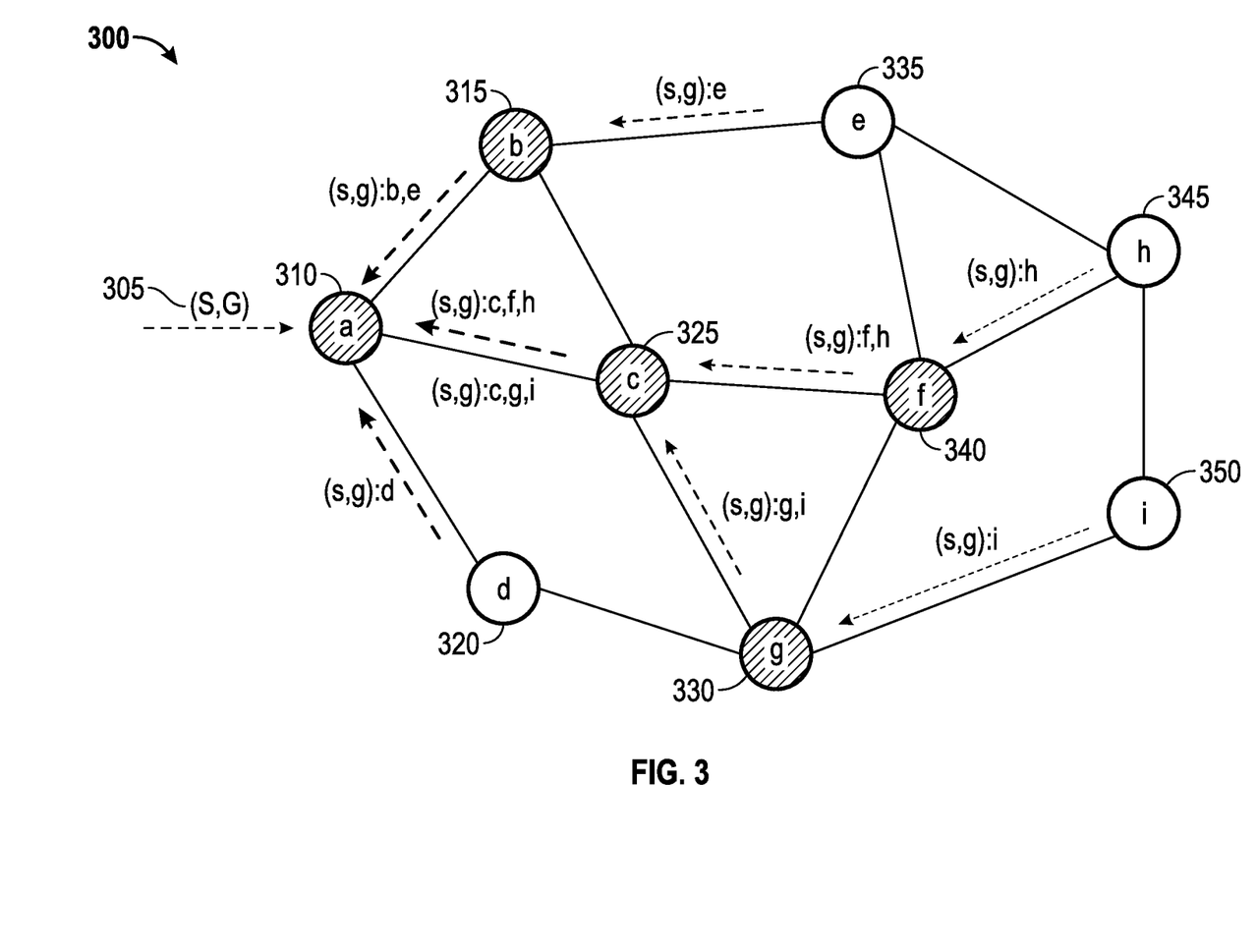
FIG. 3 conceptually illustrates signaling in a multicast network to build a multicast distribution tree according to some configurations of the subject technology.

FIG. 3 conceptually illustrates signaling in a multicast network 300 to build a multicast distribution tree according to some configurations of the subject technology. In one example, the multicast tree may be a point-to-multipoint (P2MP) tree that includes one or more labels (instead of network addresses) for a set of nodes (e.g., representing network devices such as routers in the multicast network) that describe a path from one node to the next node. These labels may identify links (e.g., paths) between respective nodes for forwarding multicast data. By way of example, a Multiprotocol Label Switching (MPLS) technique may be utilized to forward multicast data from one node to another node according to the labels in the P2MP tree.

A network device in the multicast tree (e.g., a router), however, may not forward a multicast packet(s) for a group, unless there is a request for traffic (e.g., from another network device). In some configurations, a request to join the multicast group is accomplished utilizing one or more join messages, which are sent hop by hop toward a root node of the multicast tree. In some configurations, the root node of a multicast tree acts as a "first-hop" router that is directly connected to a multicast source. The root node may keep track of multicast groups, and one or more sources that send multicast packets may be registered with the root node that acts as the first-hop router of the source(s).

As illustrated in the example of FIG. 3, one or more network devices (e.g., receivers) may signal to join a multicast group (s,g) by transmitting a message or packet to a root of the multicast distribution tree. The root of the tree is shown as a network device 310 (node a). When a network device signals a multicast group to join, the subject technology may require the network device to carry one or more identities of other nodes (e.g., an IP address or a label according to MPLS) along the path towards the multicast group root. For instance, a network device 335 sends a packet indicating a join message with an appended identity of the network device 335 ("(s,g): e") to a network device 315 (node b). The network device 315 may then send a packet indicating a join message with the appended identities of the network devices 315 and 335 ("(s, g):b,e"). Similarly, a set of network devices corresponding to 1) network devices 345, 340 and 325, 2) network devices 350, 330 and 325 and, 3) network device 320 may send respective join messages with appended identities of respective network devices along a respective path to the root node.

Once the root node (node A corresponding to network device 310) receives the path information from each of the network devices, a multicast tree can be generated by the root node. As mentioned above, the root node in some configurations is the first-hop router that is directly connected to a multicast source. To inform other downstream nodes regarding the root node, information pertaining to the root node for the multicast group may be configured at each node in a given domain that includes a set of nodes corresponding to respective network devices. In this example, the network address of the root node is stored (e.g., in a configuration setting) on each network device in the domain and each network device that wishes to join the multicast group may subsequently transmit path information to the root node accordingly. In some configurations, a bootstrap network device (e.g., bootstrap router) may be utilized to inform other network devices regarding the root node. The bootstrap network device may be another network device separate from the root node and other network devices in the domain. A candidate root node may broadcast its willingness to be a root node via a candidate message to the bootstrap network device. Upon receipt of the candidate message, the bootstrap network device then broadcasts information regarding the root node to each network device in the domain so that each network device that wishes to join the multicast group may subsequently transmit path information to the root node.

The root node corresponding to the network device 310 may store the information pertaining to the multicast tree in local storage or memory of the network device 310. Additionally, when generating the multicast tree, the root node may determine where and how many states may be "hidden" from the multicast network according to a predetermined number of multicast states. The predetermined number of multicast states determines an extent of information that will be included in a multicast tree header in a multicast packet. In some implementations, the predetermined number of multicast states may be determined based on a configuration setting at the root node (e.g., a router setting) that indicates a number of hidden multicast states. If no configuration setting is stored at the root node, some implementations may utilize a default number of multicast states (e.g., 3, 4, or 5, etc.). Based on the number of hidden multicast states, the root node may select a number of downstream child nodes according to one or more criteria for a respective child node (e.g., latency, a number of hops, shortest path length, bandwidth, etc.). In one example, the nodes corresponding to network devices 310, 315 and 325 (nodes a, b and c) may be selected and hidden from the multicast network by pushing multicast state information in a packet of a multicast transmission. Thus, it can be appreciated that the subject technology may reduce an amount of multicast state information maintained by each network device in the multicast network.

Figure 4:
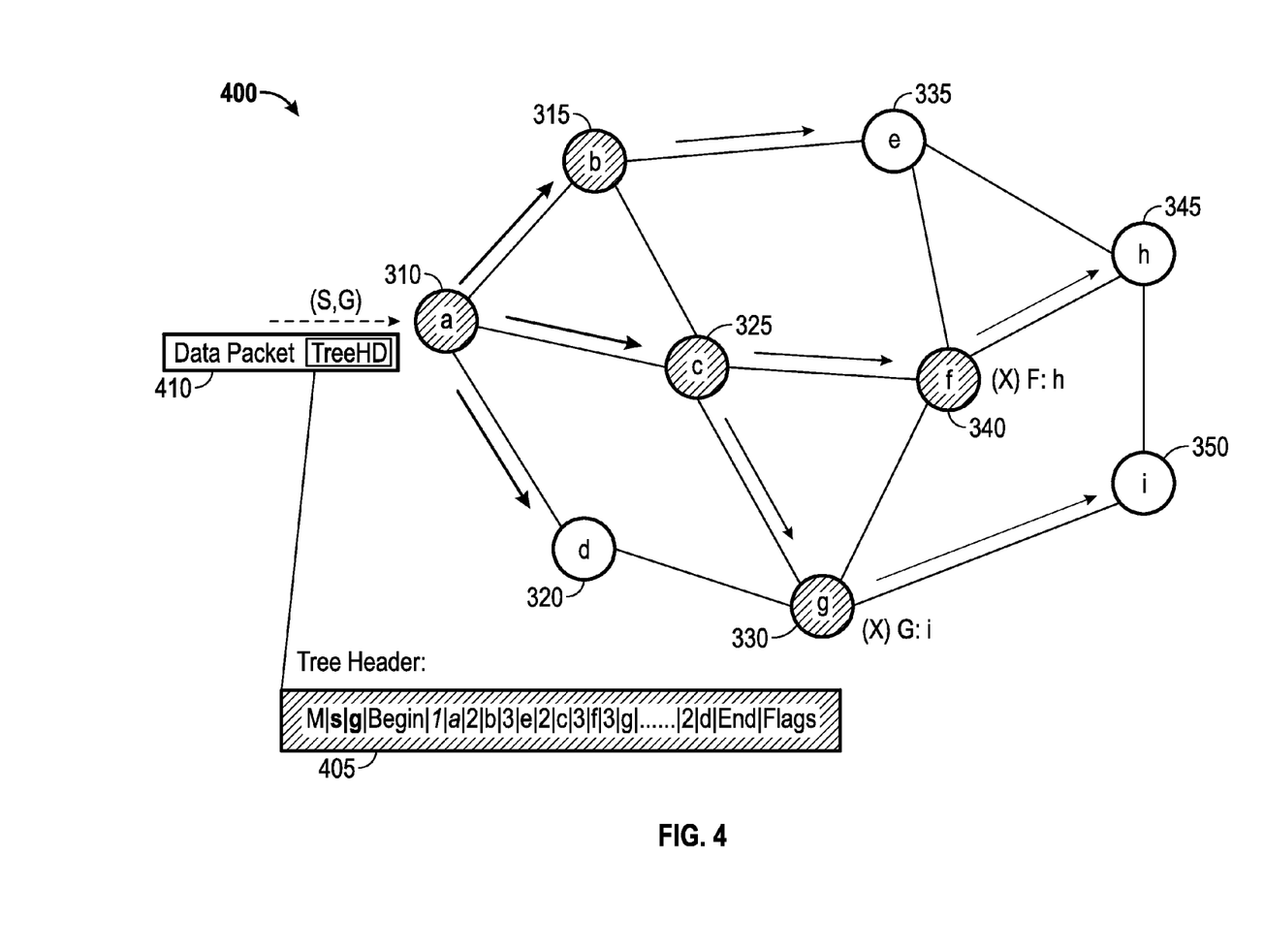
FIG. 4 conceptually illustrates an example distribution of a multicast packet in a multicast network according to some configurations of the subject technology.

FIG. 4 conceptually illustrates an example distribution of a multicast packet in a multicast network 400 according to some configurations of the subject technology. As shown, the multicast network 400 includes the same network devices as described in FIG. 3.

In the example of FIG. 4, a root node corresponding to network device 310 (node a) receives a multicast packet 410 of a multicast transmission. The multicast packet 410 may be transmitted by a source of multicast traffic that is directly connected or only one hop from the root node of the multicast network. The root node corresponding to the network device 310 may insert a tree header 405 for including multicast state information into the multicast packet 410. The tree header 405 may include components of the header as discussed in connection with FIG. 2. For instance, the tree header 405 includes a packet type field, a tree group field for indicating a tree group (e.g., (S, G)), and a tree body spanning various fields that represent different portions of the multicast distribution tree. When the root node receives the data packet 410, according to the information in the tree header 405, the root node may determine that a second level of the distribution tree corresponds to nodes b, c, and d of the multicast network 400.

Figure 5:
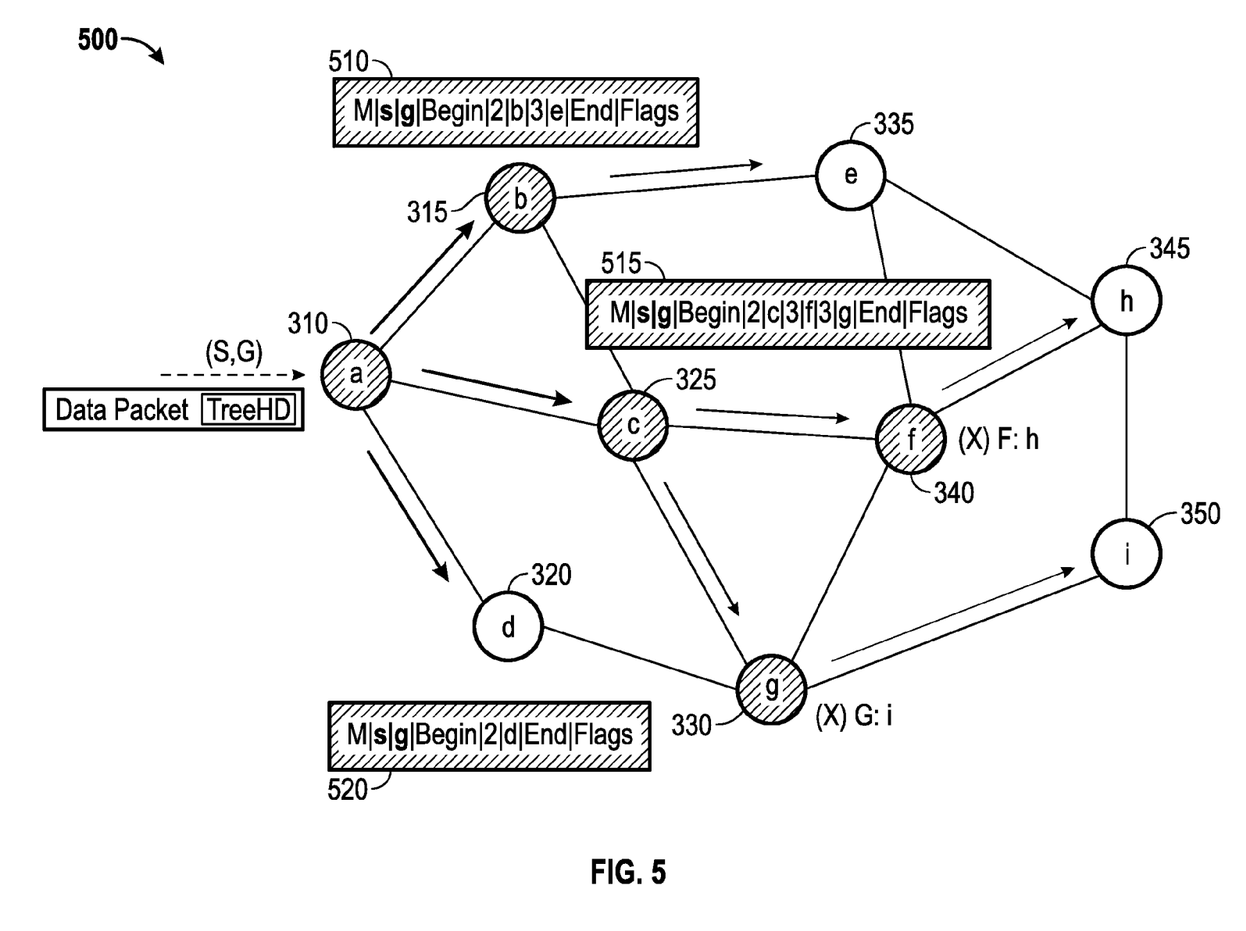
FIG. 5 conceptually illustrates an example forwarding of a multicast packet to a second level in a multicast network according to some configurations of the subject technology.

FIG. 5 conceptually illustrates an example forwarding of a multicast packet to a second level in a multicast network 500 according to some configurations of the subject technology. As shown, the multicast network 500 includes the same network devices as described in FIG. 3.

In the example shown in FIG. 5, the root node corresponding to network device 310 (node a) forwards a multicast packet (e.g., based on data from multicast packet 410 in FIG. 4) based on the information in the tree header to the second level nodes b, c and d. Respective multicast headers for each second level node are shown as multicast headers 510, 515 and 520 after a reduction is performed on the tree header included in the forwarded multicast packet. For instance, network device 315 (node b) reduces or removes one or more fields from the tree header received in the multicast packet forwarded from the network device 310.

In one example, the network device 315 may process the tree header by removing information corresponding to the root node and other second level nodes (e.g., nodes c and d) resulting in the multicast header 510. In a similar manner, network devices 320 and 325 may remove information corresponding to the root node and other second level nodes resulting in the multicast headers 520 and 515, respectively. Additionally, a respective second level node may remove information from the tree header corresponding to one or more child nodes (e.g., third level nodes) that are not associated the respective second level node.

Figure 6:
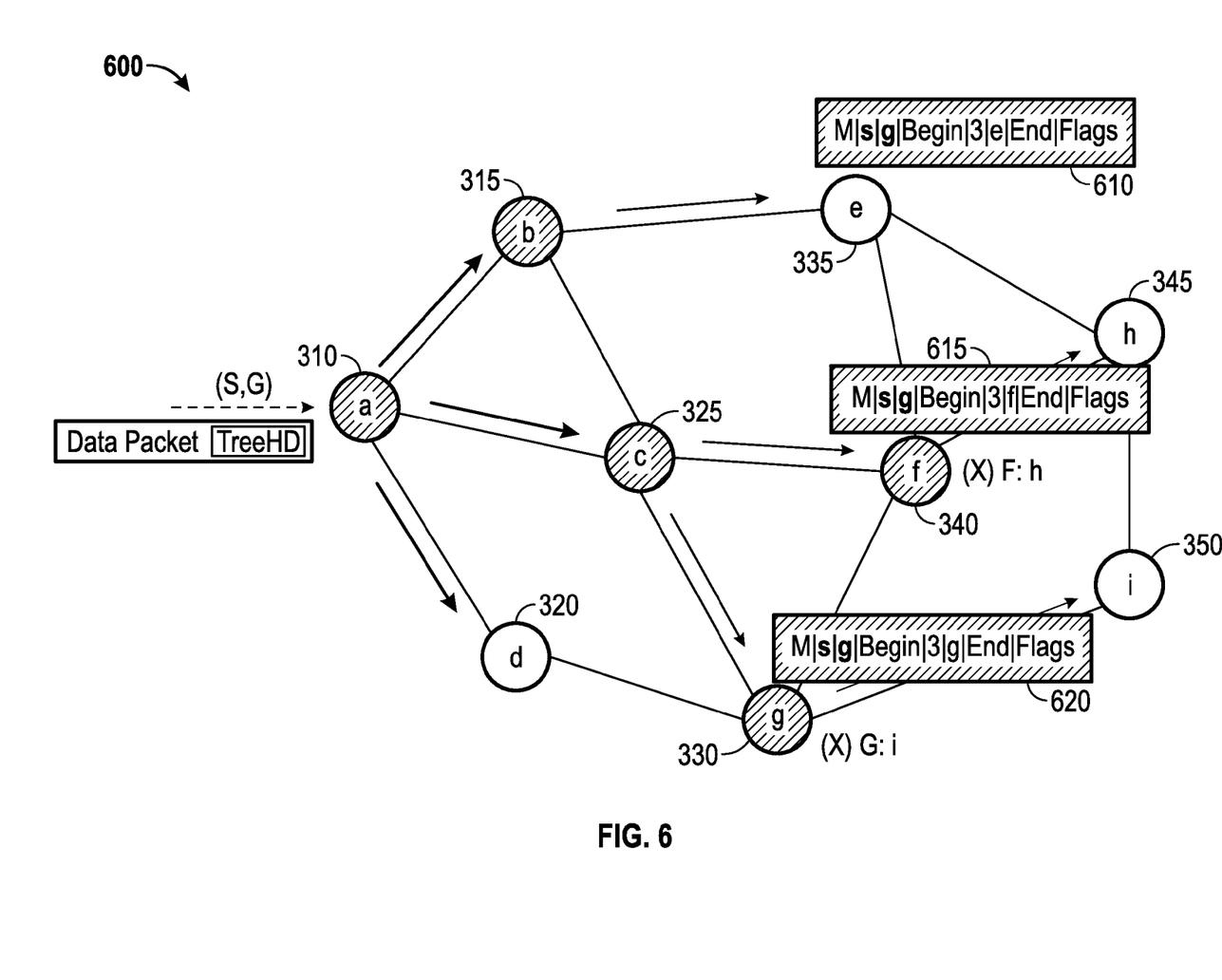
FIG. 6 conceptually illustrates an example forwarding of a multicast packet to a third level in a multicast network according to some configurations of the subject technology.

FIG. 6 conceptually illustrates an example forwarding of a multicast packet to a third level in a multicast network 600 according to some configurations of the subject technology. As shown, the multicast network 600 includes the same network devices as described in FIG. 3.

In the example shown in FIG. 6, network device 315 (node b) forwards a multicast packet to a third level node (node e) corresponding to network device 335. Network device 325 (node c) forwards a multicast packet to a third level node corresponding to network device 340 (node f) and to a third level node corresponding to network device 330 (node g). Respective new multicast headers 615 and 620 are included in the respective multicast packets forwarded by network device 325 to network device 340 and network device 330. The network device 325 may remove information corresponding to a second level node (e.g., node c) resulting in the multicast headers 615 and 620.

In this example, the network device 340 (node f) locally maintains forwarding state information for the multicast tree 600 at the network device 340 and does not rely on information provided by the tree header from a received multicast packet. Based on the locally maintained state information, the network device 340 may determine a forwarding state for the multicast packet and subsequently forward the multicast packet to network device 345 (node h). Similarly, the network device 330 (node g) locally maintains forwarding state information for the multicast tree 600 at the network device 330 and does not rely on information provided by the tree header from a received multicast packet. The network device 330 may determine a forwarding state for the multicast packet and subsequently forward the multicast packet to network device 350 (node i). Network devices 345 and 350, after respectively receiving multicast packets forwarded from network devices 340 and 330, may determine from information in the multicast header of the packet that there is no forwarding state information for the multicast tree. Each of the network devices 345 and 350 may then remove the multicast header and process the received multicast packet accordingly.

Further, network device 320 (node d), after receiving a multicast packet forwarded from network device 310, may determine from information in the multicast header of the packet that there is no forwarding state information for the multicast tree. The network device 320 may then remove the multicast header and process the received multicast packet accordingly.

Similarly, network device 335 (node e), after receiving a multicast packet forwarded from the network device 315, may determine from information in the multicast header of the packet that there is no forwarding state information for the multicast tree. The network device 335 may then remove the multicast header and process the received multicast packet accordingly.

In some configurations, a downstream network device (e.g., network devices 320, 335, 345 or 350) that receives a multicast packet in which no additional forwarding information is included in the multicast packet may retain a portion of the originating state information included in the multicast header. For instance, such a network device may retain state information for the penultimate and/or antepenultimate network device(s) in the path. By way of example, the network device 335 may retain multicast state information for the network device 315 and/or the network device 310. In a similar fashion, the network device 340 may retain multicast state information for the network device 325 and/or the network device 310, or the network device 330 may retain multicast state information for the network device 325 and/or the network device 310.

Figure 7:
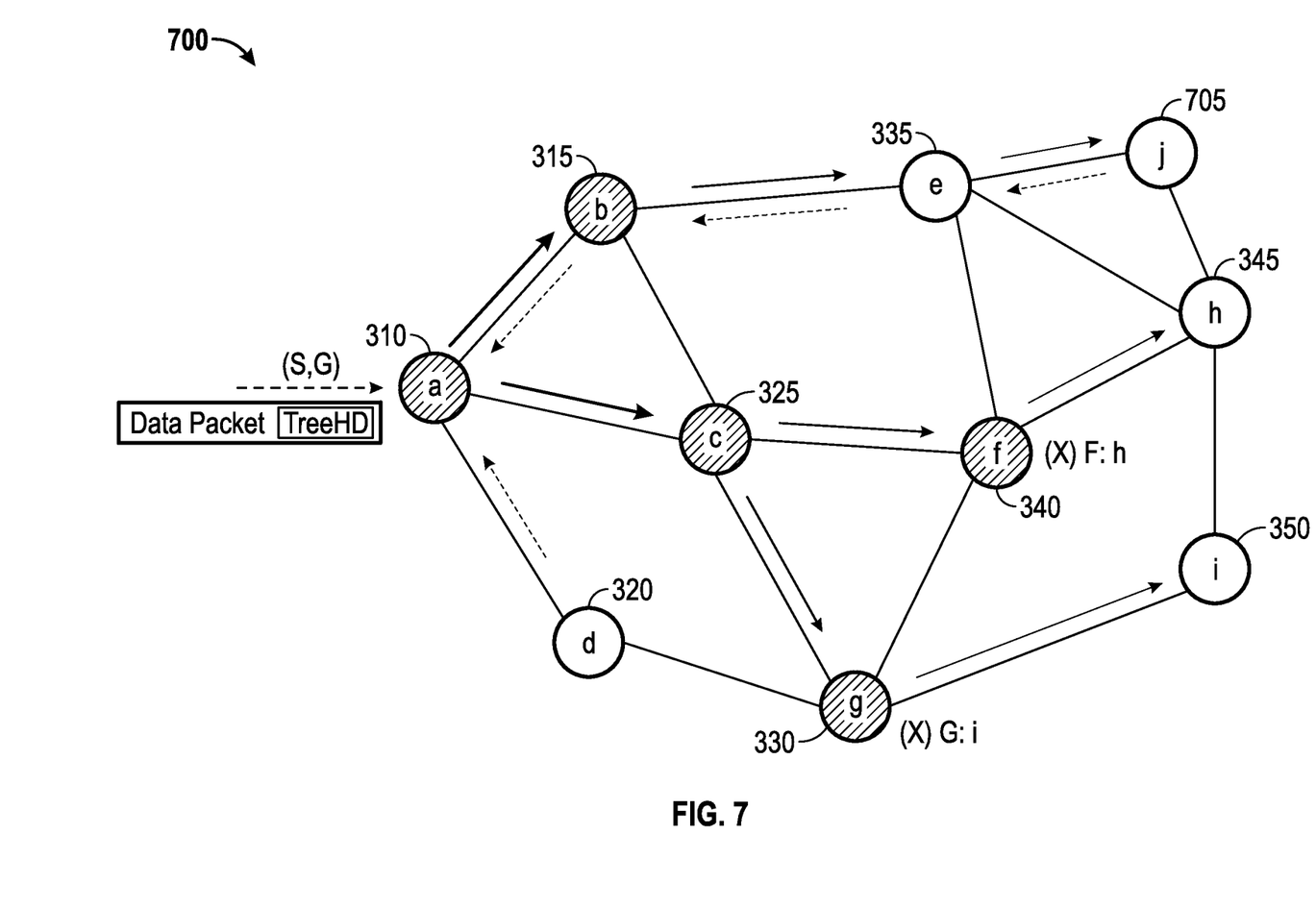
FIG. 7 conceptually illustrates an example of reconfiguring a multicast network 700 according to some configurations of the subject technology.

FIG. 7 conceptually illustrates an example of reconfiguring a multicast network 700 according to some configurations of the subject technology. As shown, the multicast network 700 includes the network devices as described in FIG. 3 with an additional network device 705 (node j).

In the example shown in FIG. 7, the network device 705 may join the multicast group by transmitting a message to network device 310 (node a) corresponding to the root node of the multicast network which may cause the network device 310 to re-structure a tree header due to changes in the multicast tree. For instance, the network device 705 transmits a join message including an identity of the network device 705 toward the root node that travels, hop by hop, across network devices 335 and 315 before being received by the network device 310. At each hop, the network device 335 may append its identity to the join message and the network device 315 may also append its identity to the join message. After receiving the join message, the network device 310 may update tree header information for the multicast tree to include the additional network device 705.

An existing network device such as network device 320 (node d) may leave the multicast group by transmitting a message to the network device 310 (node a) corresponding to the root node of the multicast network. For instance, when multicast traffic is no longer required, the network device 320 may send a "prune" message toward the root node corresponding to the network device 310 to prune (or remove) unnecessary multicast traffic. After the network device 310 receives the prune message, tree header information corresponding to the network device 320 may be removed by the network device 310.

Figure 8:
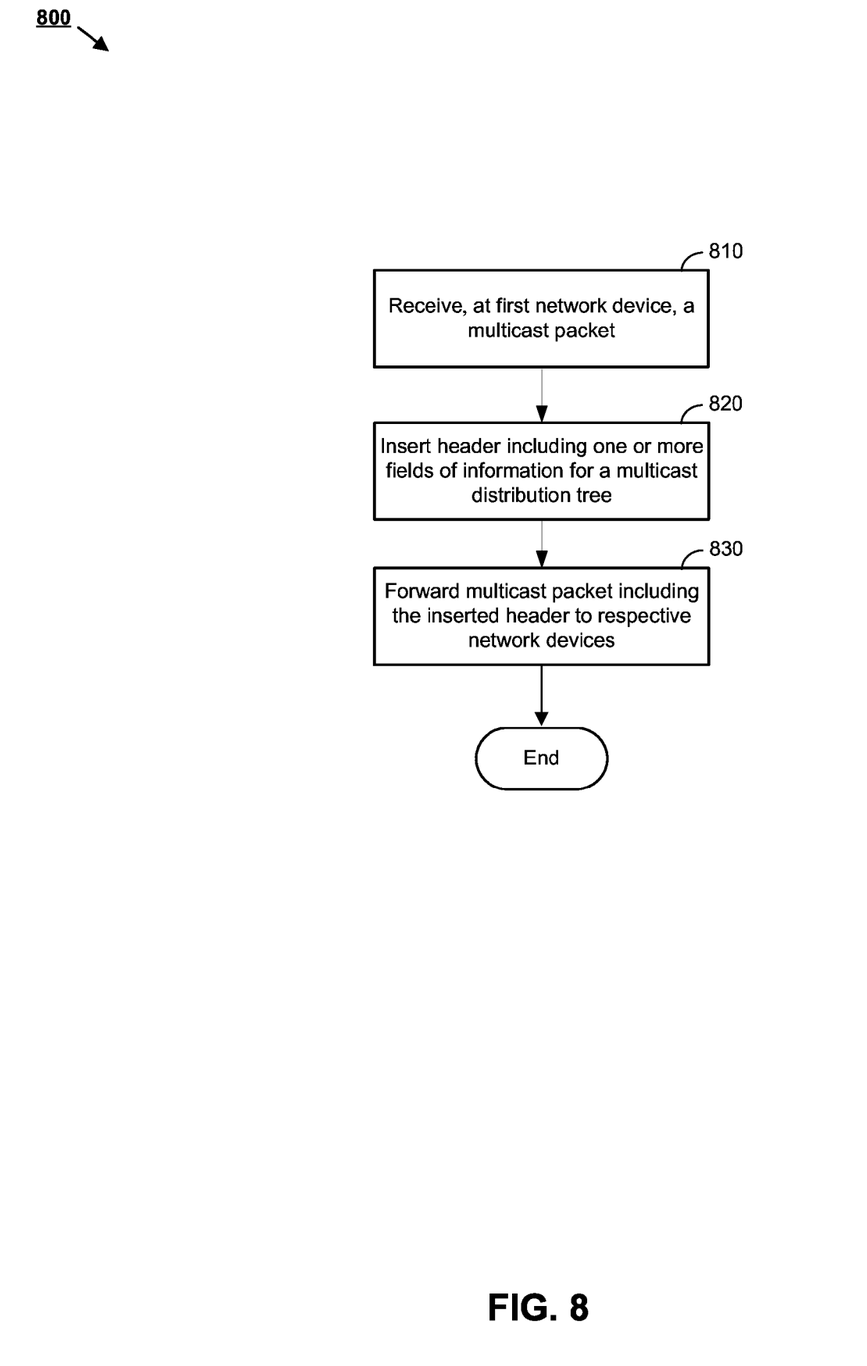
FIG. 8 conceptually illustrates an example process of inserting a multicast tree header information into a multicast packet according to some configurations of the subject technology.

FIG. 8 conceptually illustrates an example process 800 of inserting a multicast tree header information into a multicast packet according to some configurations of the subject technology. In some configurations, the process 800 may be implemented by one or more computing devices or systems.

The process 800 begins at 810 by receiving, at first network device, a multicast packet of a multicast transmission from a multicast source. The multicast source is a server that is one hop away from the first network device in some configurations. The first network device is a router or switch in some configurations. In one example, the multicast packet is received at a root node of a multicast distribution tree.

At 820, the process 800 inserts a header including one or more fields of information for a multicast distribution tree into the multicast packet in which the fields of information include at least 1) a root level node field indicating a root node of the multicast distribution tree, and 2) one or more second level fields indicating one or more child nodes of the root node of the multicast distribution tree. In some implementations, the fields of information are not duplicative of routing information (e.g., in a routing table or data structure), stored by the first network device, corresponding to the one or more child nodes.

The one or more child nodes of the root node may be a second level of the multicast distribution tree as indicated by the header. The header further includes a third level node field corresponding to a child node of a respective node from the second level of the multicast distribution tree in some configurations. Additionally, the header may include a field including one or more flags indicating a set of nodes of the multicast distribution tree that locally maintain multicast state information.

In some configurations, the header is appended to a respective header of the multicast packet. An aggregate size of the multicast packet (including the header appended to the respective header of the multicast packet) may be a size of a maximum transmission unit (MTU). The size of the MTU may be up to 9,000 bytes in some examples.

The process 800 at 830 forwards the multicast packet including the inserted header to respective network devices corresponding to the one or more child nodes based on the one or more fields of information from the inserted header. The process 800 then ends.

Figure 9:
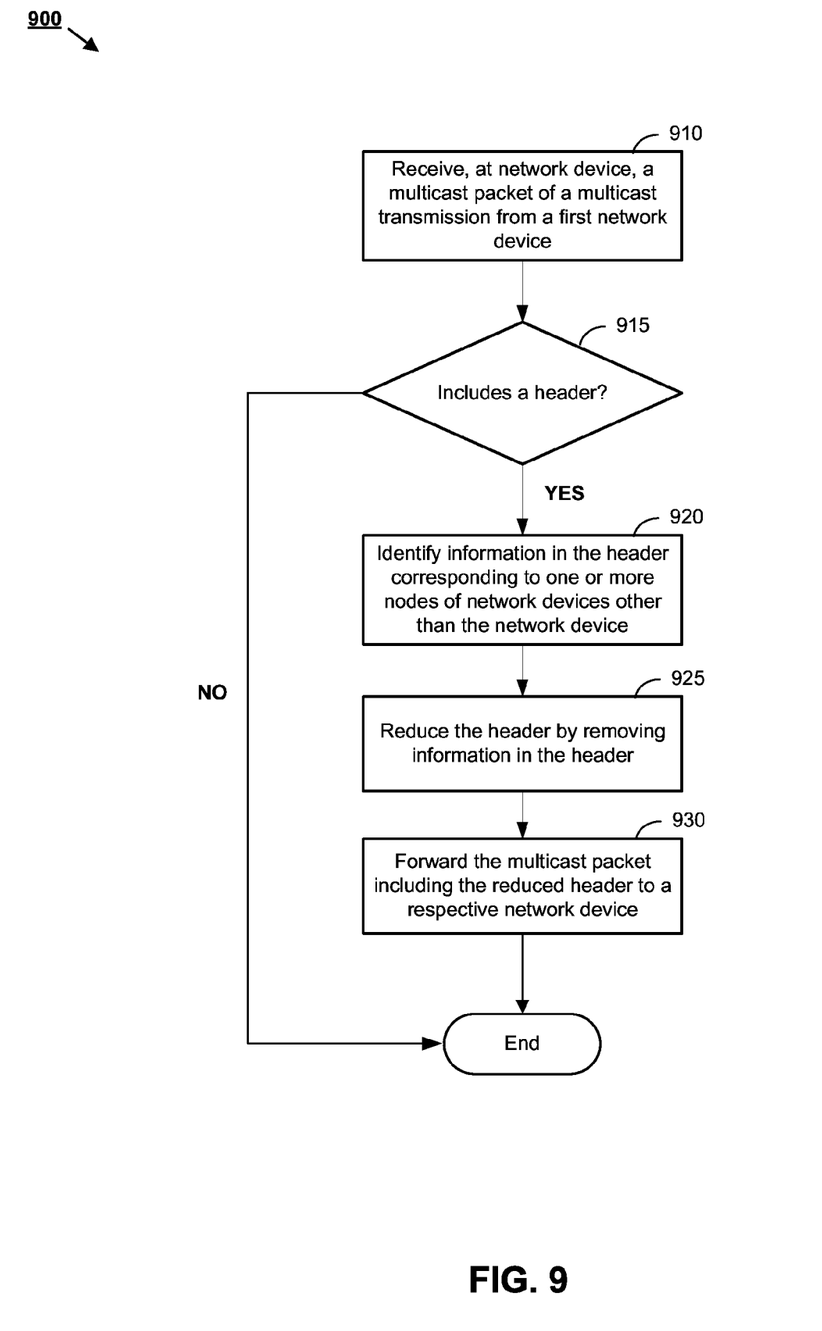
FIG. 9 conceptually illustrates an example process of reducing multicast tree header information included in a multicast packet according to some configurations of the subject technology.

FIG. 9 conceptually illustrates an example process 900 of reducing multicast tree header information included in a multicast packet according to some configurations of the subject technology. In some configurations, the process 900 may be implemented by one or more computing devices or systems.

The process 900 begins at 910 by receiving, at a network device, a multicast packet of a multicast transmission from a first network device. The network device and the first network device may be included in a given multicast network in some example. For example, the first network device is a router or switch in some configurations, and the network device may also be a router or switch.

At 915, the process 900 determines whether the multicast packet includes a header including one or more fields of information for a multicast distribution tree. In some configurations, the fields of information include a root level node field indicating a root node of the multicast distribution tree and one or more second level fields indicating one or more child nodes of the root node of the multicast distribution tree. Additionally, in some implementations, the fields of information are not duplicative of routing information, stored by the network device, corresponding to the one or more child nodes. The network device may correspond to a node from among the one or more child nodes and each node of the multicast distribution tree may correspond to a respective network device in the multicast network. If the multicast packet does not include the header, the process 900 then ends.

Alternatively, responsive to determining that the multicast packet includes the header, the process 900 continues to 920 to identify information in the header corresponding to one or more nodes of network devices other than the network device.

At 925, the process 900 reduces the header by removing information in the header corresponding to one or more nodes of network devices other than the network device. The reduced header may further include a third level node field corresponding to a child node of the node of the network device.

The process 900 at 930 forwards the multicast packet including the reduced header to a respective network device corresponding to a child node of the node of the network device based on the one or more fields of information from the reduced header. The respective network device is one hop away from the network device in some configurations. The process 900 then ends.

Figures 10, 11:
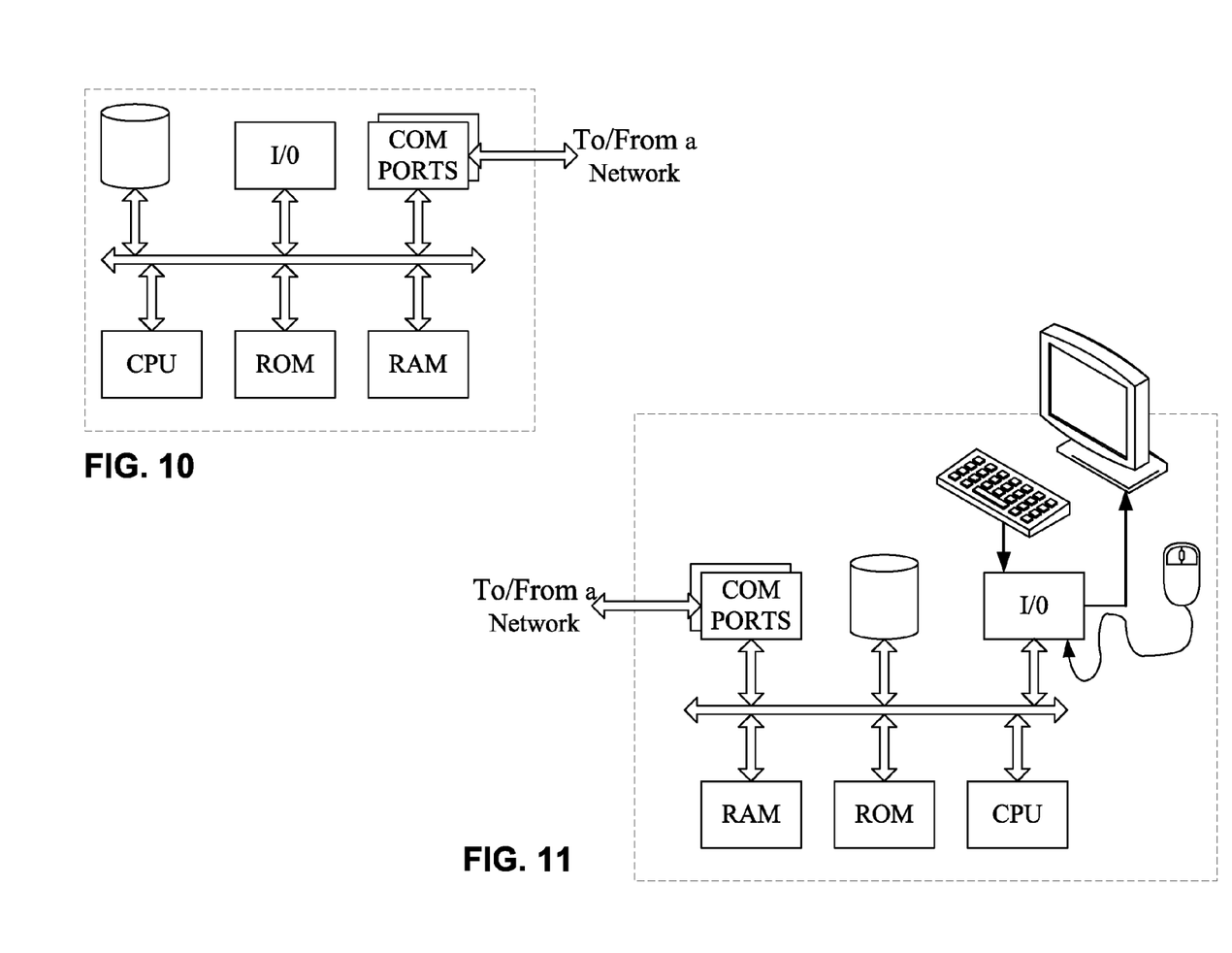
FIG. 10 is a simplified functional block diagram of a computer that may be configured as a host or server.
FIG. 11 is a simplified functional block diagram of a personal computer or other work station or terminal device.

FIG. 10 and FIG. 11 provide functional block diagram illustrations of general purpose computer hardware platforms. FIG. 10 illustrates a network or host computer platform, as may typically be used to implement a server. FIG. 11 depicts a computer with user interface elements, as may be used to implement a personal computer or other type of work station or terminal device, although the computer of FIG. 11 may also act as a server if appropriately programmed. It is believed that the general structure and general operation of such equipment as shown in FIGS. 10 and 11 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 11). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the subject technology outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform that will be a server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the subject technology shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
receiving, at a first network device, a multicast packet of a multicast transmission from a multicast source;
inserting a header including one or more fields of information for a multicast distribution tree into the multicast packet, wherein the one or more fields of information include a root level node field indicating a root node of the multicast distribution tree and one or more second level fields indicating one or more child nodes of the root node of the multicast distribution tree, wherein the multicast distribution tree comprises a point-to-multipoint tree and the one or more fields of information are not duplicative of routing information, stored by the first network device, corresponding to the one or more child nodes, and wherein the one or more fields of information identify links between respective nodes for forwarding the multicast packet; and
forwarding the multicast packet including the inserted header to respective network devices corresponding to the one or more child nodes based on the one or more fields of information from the inserted header.

2. The method of claim 1, wherein inserting the header including the one or more second level fields indicating the one or more child nodes is based on a predetermined number of multicast states.

3. The method of claim 2, wherein the one or more child nodes are selected for insertion into the header based on one or more criteria corresponding to a respective child node.

4. The method of claim 3, wherein the one or more criteria comprises at least one of a latency of the respective child node, a number of hops from the first network device, a shortest path length from the first network device, and a bandwidth of the respective child node.

5. The method of claim 1, wherein the header further comprises a field including one or more flags indicating a set of nodes of the multicast distribution tree that locally maintain multicast state information.

6. The method of claim 1, wherein the one or more child nodes of the root node comprise a second level of the multicast distribution tree as indicated by the header.

7. The method of claim 6, wherein the header further comprises a third level node field corresponding to a child node of a respective node from the second level of the multicast distribution tree.

8. The method of claim 1, wherein the header is appended to a respective header of the multicast packet.

9. The method of claim 8, wherein an aggregate size of the multicast packet including the header appended to the respective header of the multicast packet comprises a size of a maximum transmission unit (MTU).

10. The method of claim 1, wherein the forwarding of the multicast packet is performed in accordance with a Multiprotocol Label Switching ("MPLS") technique.

11. A computer-implemented method comprising:
receiving, at a network device, a multicast packet of a multicast transmission from a first network device;
determining whether the multicast packet includes a header including one or more fields of information for a multicast distribution tree, wherein the fields of information include a root level node field indicating a root node of the multicast distribution tree and one or more second level fields indicating one or more child nodes of the root node of the multicast distribution tree, wherein the network device corresponds to a node from among the one or more child nodes and each node of the multicast distribution tree corresponds to a respective network device, and wherein the fields of information are not duplicative of routing information, stored by the network device, corresponding to the one or more child nodes;
responsive to determining that the multicast packet includes the header, identifying information in the header corresponding to one or more nodes of network devices other than the network device and one or more child nodes associated with the network device;
reducing the header by removing information in the header corresponding to the one or more nodes of network devices other than the network device and one or more child nodes associated with the network device; and
forwarding the multicast packet including the reduced header to a respective network device corresponding to a child node of the node of the network device based on the one or more fields of information from the reduced header.

12. The method of claim 11, wherein the reduced header further comprises a third level node field corresponding to the child node of the node of the network device.

13. The method of claim 11, wherein the reduced header further comprises a field including one or more flags indicating a set of nodes of the multicast distribution tree that locally maintain multicast state information.

14. The method of claim 11, wherein the reduced header is appended to a respective header of the multicast packet.

15. A system comprising:
a processor;
a memory comprising instructions stored therein, which when executed by the one or more processors, cause the processor to perform operations comprising:
receiving a multicast packet of a multicast transmission from a multicast source;
inserting a header including one or more fields of information for a multicast distribution tree into the multicast packet, wherein the one or more fields of information include a root level node field indicating a root node of the multicast distribution tree and one or more second level fields indicating one or more child nodes of the root node of the multicast distribution tree, wherein the multicast distribution tree comprises a point-to-multipoint tree and the one or more fields of information are not duplicative of routing information, stored by the system, corresponding to the one or more child nodes, and wherein the one or more fields of information identify links between respective nodes for forwarding the multicast packet; and
forwarding the multicast packet including the inserted header to respective network devices corresponding to the one or more child nodes based on the one or more fields of information from the inserted header.

16. The system of claim 15, wherein inserting the header including the one or more second level fields indicating the one or more child nodes is based on a predetermined number of multicast states.

17. The system of claim 16, wherein the one or more child nodes are selected for insertion into the header based on one or more criteria corresponding to a respective child node.

18. The system of claim 17, wherein the one or more criteria comprises at least one of a latency of the respective child node, a number of hops, a shortest path length, and a bandwidth of the respective child node.

19. The system of claim 15, wherein the one or more child nodes of the root node comprise a second level of the multicast distribution tree as indicated by the header.

20. The system of claim 19, wherein the header further comprises a third level node field corresponding to a child node of a respective node from the second level of the multicast distribution tree.

21. The system of claim 15, wherein the header further comprises a field including one or more flags indicating a set of nodes of the multicast distribution tree that locally maintain multicast state information.

22. The system of claim 15, wherein the header is appended to a respective header of the multicast packet.

* * * * *